United States Patent
Sinn et al.

(10) Patent No.: US 10,042,539 B2
(45) Date of Patent: Aug. 7, 2018

(54) DYNAMIC TEXT CONTROL FOR MOBILE DEVICES

(71) Applicant: Adobe Systems Incorporated, San Jose, CA (US)

(72) Inventors: Richard Sinn, Milpitas, CA (US); Rick Scott Seeler, Scotts Valley, CA (US); Guy Christopher Nicholas, Santa Rosa, CA (US); Philip Andrew Baudoin, New York, NY (US); Mathieu Badimon, New York, NY (US)

(73) Assignee: Adobe Systems Incorporated, San Jose, CA (US)

( * ) Notice: Subject to any disclaimer, the term of this patent is extended or adjusted under 35 U.S.C. 154(b) by 94 days.

(21) Appl. No.: 14/619,872

(22) Filed: Feb. 11, 2015

(65) Prior Publication Data

US 2016/0231914 A1    Aug. 11, 2016

(51) Int. Cl.
*G06F 17/21* (2006.01)
*G06F 3/0484* (2013.01)
*G06F 3/0487* (2013.01)

(52) U.S. Cl.
CPC ........ *G06F 3/04847* (2013.01); *G06F 3/0487* (2013.01); *G06F 17/211* (2013.01); *G06F 17/212* (2013.01)

(58) Field of Classification Search
None
See application file for complete search history.

(56) References Cited

U.S. PATENT DOCUMENTS

| | | | |
|---|---|---|---|
| 2007/0140565 A1* | 6/2007 | Lin | G06K 9/00416 382/203 |
| 2012/0066577 A1* | 3/2012 | Saini | G06F 17/30905 715/211 |
| 2012/0110439 A1* | 5/2012 | Rosner | G06F 17/248 715/246 |
| 2013/0019204 A1* | 1/2013 | Kotler | G06F 3/04812 715/833 |
| 2013/0132831 A1* | 5/2013 | Baird | G06Q 10/10 715/255 |
| 2014/0096038 A1* | 4/2014 | Schultz | G06F 3/0484 715/753 |
| 2015/0363381 A1* | 12/2015 | Otaki | G06F 17/248 715/234 |

* cited by examiner

*Primary Examiner* — Stephen S Hong
*Assistant Examiner* — Sanchita Roy
(74) *Attorney, Agent, or Firm* — Finch & Maloney PLLC

(57) ABSTRACT

A computer-implemented method for designing a digital design layout that includes text includes receiving a first user input requesting creation of a text editing element. The text editing element may include a text window and one or more graphical user interface controls associated with the text window. In response to receiving the first user input, the text editing element is displayed via a graphical user interface. The text editing element includes a graphical representation of a text window containing text, an adjustable slide control for changing the text characteristic, and a resize handle for changing the size of the text window. The method further includes receiving a second user input requesting adjustment of the adjustable slide control. In response to receiving the second user input, a characteristic of the text contained in the text window is changed without changing the width and the height of the text window.

20 Claims, 10 Drawing Sheets

Lorem ipsum
dolor sit amet,
consectetur

Lorem ipsum

Lorem

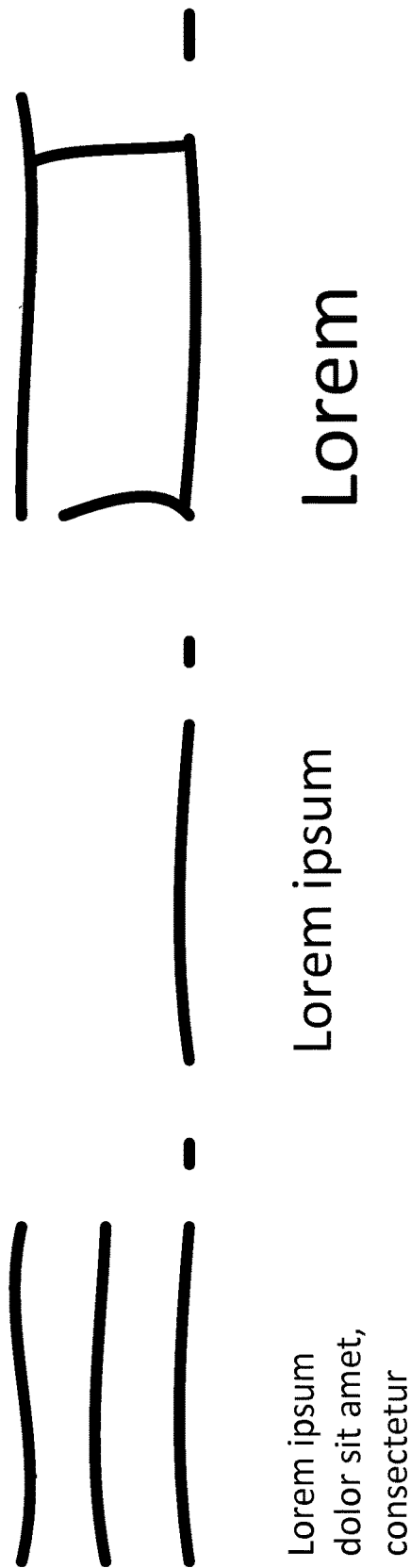

DYNAMIC TEXT CONTROL FOR MOBILE DEVICES

FIELD OF THE DISCLOSURE

This disclosure relates to the field of data processing, and more particularly, to techniques for designing a digital design layout that includes text.

BACKGROUND

Smart phones, tablets and other mobile computing devices are popular platforms for displaying digital assets, such as a digital poster, e-newspaper article, electronic essay paper or other content. One common problem encountered when designing such assets, particularly when using a mobile device, is that it is difficult to see the effect of text on the overall page layout. Some existing design techniques, such as found in Microsoft PowerPoint, include creating an empty text box and typing text into the text box. The text box defines the region of the page in which text is displayed. After typing the text, changes to the text can be made by highlighting the text, opening a property window or drop-down menu and changing the properties of the text accordingly. Such changes can be accomplished using interactive tools that are designed to work with mouse and keyboard input devices. As such, it may take, for example, six or seven clicks or keystrokes to see how the changes applied to the text affect the overall design. Thus, there is a need for improved techniques for seeing the effect of changes to text during a design process in a mobile device that is fast, interactive and requires a minimal number of user inputs.

BRIEF DESCRIPTION OF THE DRAWINGS

The accompanying drawings are not intended to be drawn to scale. In the drawings, each identical or nearly identical component that is illustrated in various figures is represented by a like numeral.

FIGS. 3A, 3B and 3C show screenshots of example digital design layouts as they appear in a GUI, in accordance with various embodiments of the present invention.

DETAILED DESCRIPTION

Figure 1:
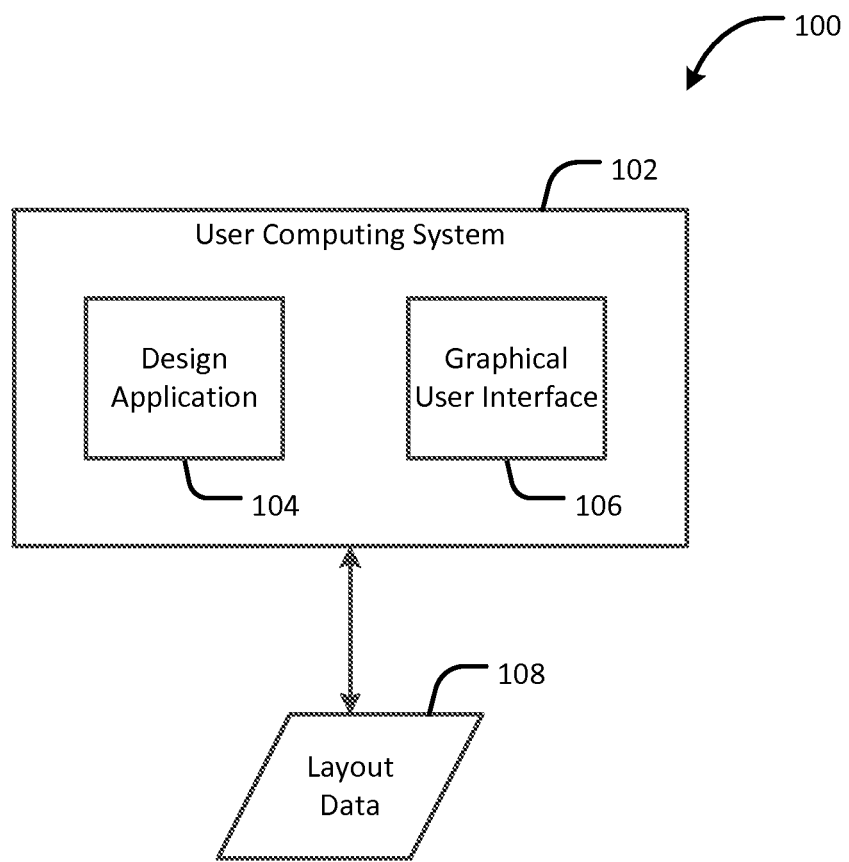
FIG. 1 shows an example system for designing a digital design layout that includes text, in accordance with an embodiment of the present invention.

Graphical user interface (GUI) tools can be used during the design of an electronic layout. For example, with some existing techniques, a text box can be displayed in the GUI along with resizing handles at the corners of the text box. The size of the text box can be changed by dragging the resizing handles using, for instance, a mouse or, on a touch-sensitive screen, a finger. However, with such existing techniques, other characteristics of the text box, such as the size, color or spacing of the letters or lines in the text box, must be changed using menus, drop down lists, or keyboard inputs, which involve additional user actions. Such user actions can be more difficult to perform on a mobile device (e.g., smart phone or tablet) than a desktop or laptop device, since mobile devices are not typically used with a physical keyboard or mouse; instead, all user inputs are driven by finger taps or gestures on the touch-sensitive screen. In some other existing techniques, resizing the text window automatically changes the font size (e.g., enlarging the text window increases the font size). However, such existing techniques do not support both resizing the text window and the font size using single action, swipe or drag-type controls.

To this end, and in accordance with an embodiment of the present invention, techniques are disclosed for designing a digital design layout that includes text. In particular, a computer-implemented method for designing a digital layout that includes text in a digital medium environment includes receiving a first user input requesting creation of a text editing element in the digital layout. The text editing element may include, for example, a text window and one or more graphical user interface controls associated with the text window. In response to receiving the first user input, the text editing element is displayed via a graphical user interface. The text editing element includes a graphical representation of a text window containing text, an adjustable slide control for changing the text characteristic, and a resize handle for changing the width of the text window, the height of the text window, or both. The text has an associated characteristic, such as font size, font color, and letter spacing or line spacing. The method further includes receiving a second user input requesting adjustment of the adjustable slide control. In response to receiving the second user input, a characteristic of the text contained in the text window is dynamically changed without changing the width and the height of the text window. For example, moving the adjustable slide control may increase or decrease the font size, change the font color, or change the letter spacing or line spacing without changing the size of the text window. Further, moving the resize handle may increase or decrease the height or width of the text window without changing the text characteristic (e.g., font size). In this manner, the text characteristics and the text window size can be changed separately using controls that respond to single action, swipe or drag-type inputs, which are particularly useful for mobile device applications. This is in contrast to some existing techniques, in which multiple discrete actions (e.g., several mouse clicks or keystrokes) are required to perform similar text editing operations. Numerous configurations and variations will be apparent in light of this disclosure.

As used in this disclosure, the term "digital layout" refers to an electronic data format in which the text, images, graphics and other visual elements appear in certain positions with respect to a given page of a publication. Generally, such visual elements do not re-flow between lines or pages of the publication, as the layout is intended to define their positions relative to each other or to a given page.

Example System

FIG. 1 shows an example system 100 for designing a digital design layout that includes text, in accordance with an embodiment. The system 100 includes a user computing system 102 and digital design layout data 108, which may be stored in a database on the user computing system 102, a server, or a cloud-based computing system. The user computing system 102 may include, for example, a mobile computing device, such as a smart phone or tablet computer having a touch-sensitive display screen for receiving user inputs, or any other computing device, such as a desktop or laptop computer. The user computing system includes a design application 104 and a graphical user interface 106. In cases where the system 100 includes more than one user computing system 102, such user computing systems can be interconnected to a wired or wireless data communications network (e.g., the Internet or an intranet). The design application 104 is configured to generate and provide a GUI for generating and modifying the digital design layout data 108, which includes text. Examples of such GUIs are described in further detail with respect to FIGS. 3 through 7. In some cases, the design application 104 can reside on and be executed by a cloud-based computing system.

Example Methodology

Figure 2:
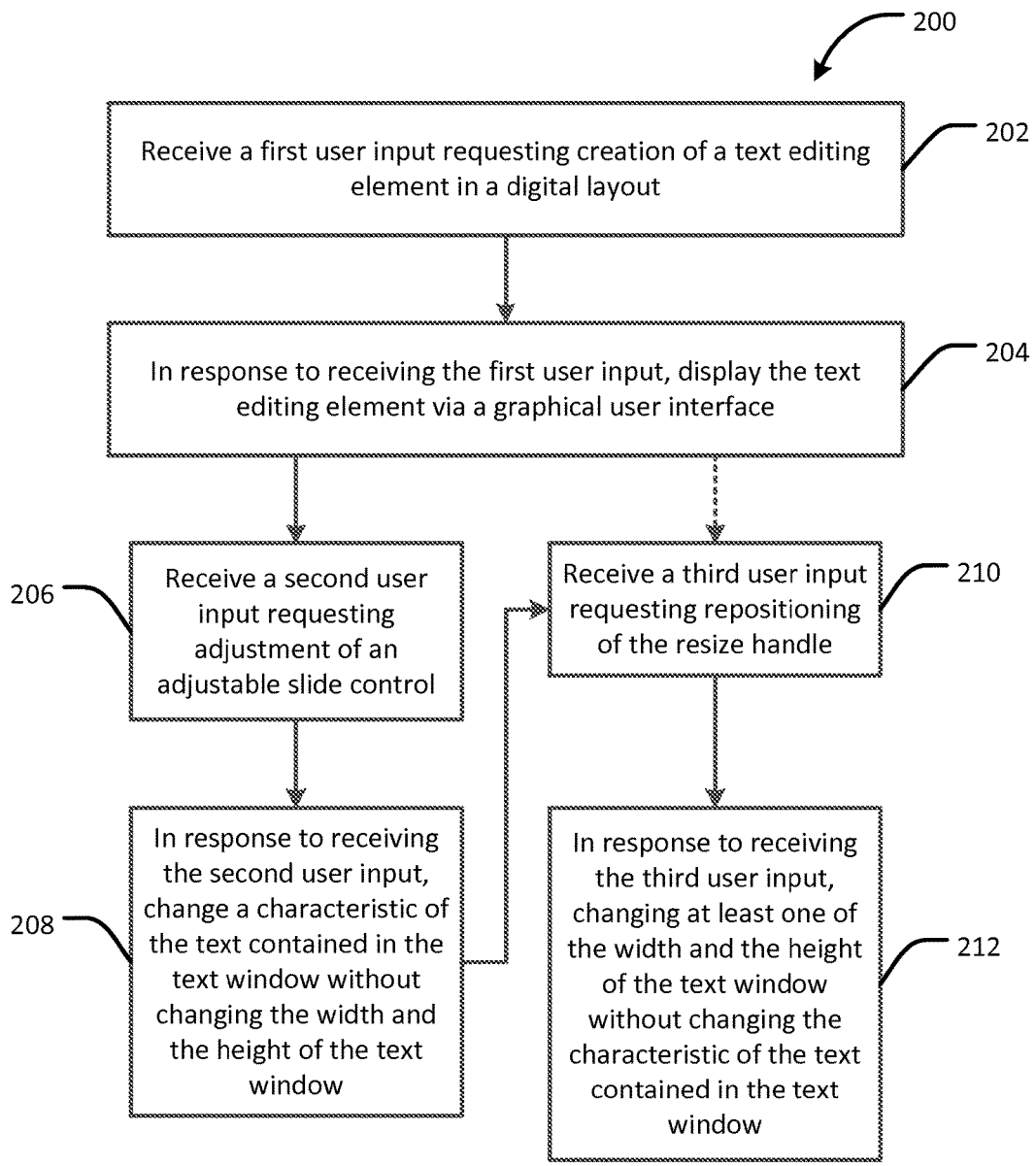
FIG. 2 is a flow diagram of an example methodology for designing a digital design layout that includes text in a digital medium environment, in accordance with an embodiment of the present invention.

FIG. 2 is a flow diagram of an example methodology 200 for designing a digital layout that includes text in a digital medium environment, in accordance with an embodiment. The method 200 may be performed, for example, in whole or in part by the design application 104, the graphical user interface 106, or any combination of these, such as described with respect to FIG. 1. The method 200 begins by receiving 202 a first user input requesting creation of a text editing element in a digital layout. The first user input may be, for example, a swipe gesture or mouse drag input to the digital layout, or a combination of such inputs. Examples of such a first user input include one or more a horizontal lines drawn within a portion of the graphical user interface, and a quadrilateral geometric shape (e.g., a square or rectangle) drawn within a portion of the graphical user interface, such as described with respect to FIG. 3A. In some cases, the first user input can further include a dot or short horizontal line near the other horizontal lines or geometric shape (e.g., adjacent to the lower right corner of the horizontal lines or geometric shape). In response to receiving the first user input, the method 200 continues by displaying 204 the text editing element via a graphical user interface, such as described with respect to FIG. 4. In cases where the first user input includes a horizontal line drawn within a portion of the graphical user interface, the text window is located in the same portion of the graphical user interface as the horizontal line. In cases where the first user input includes a quadrilateral geometric shape drawn within a portion of the graphical user interface, the text window is located in the same portion of the graphical user interface as the quadrilateral geometric shape.

The text editing element includes a graphical representation of a text window containing text, an adjustable slide control for changing a text characteristic, and a resize handle for changing the width of the text window, the height of the text window, or both. The text characteristic may be, for example, font size, font color, letter spacing or line spacing, or any combination of these. Other text characteristics that fall within the scope of various embodiments will be apparent in view of the disclosure, such as typeface, weight, letter case, italics, underline, strikethrough, subscript, superscript, highlight color, text justification, line spacing, letter spacing, kerning, point size, line length, indentation, margin size, bulleting or numbering, and other typographic attributes. In some cases, the adjustable slide control is located adjacent to the text window, and adjustment of the adjustable slide control is not bounded by the width and the height of the text window.

The method 200 continues by receiving 206 a second user input requesting adjustment of the adjustable slide control. In response to receiving the second user input, the method 200 continues by dynamically changing 208 the characteristic of the text contained in the text window (e.g., font size, font color or letter or line spacing) without changing the width and the height of the text window, such as described with respect to FIGS. 5 and 6. In some cases, the text characteristic is a font size, and the changing 208 of the characteristic includes changing the font size from a first size to a second size that is different than the first size. For example, the font size may be changed from 12 point to 8 point, or from 14 point to 30 point. In some cases, the difference between the first and second sizes is proportional to the amount of adjustment of the adjustable slide control (e.g., the farther the adjustable slide control is moved, or the higher degree to which the adjustable slide control is manipulated, the greater the amount of change in the text characteristic). In some cases, the text characteristic is a font color, and the changing 208 of the characteristic includes changing the font color from a first color to a second color that is different than the first color. In some cases, the text characteristic is a letter spacing or line spacing, and the changing of the characteristic includes changing the letter spacing or line spacing from a first spacing to a second spacing that is different than the first spacing.

In some cases, the method 200 includes receiving 210 a third user input requesting repositioning of the resize handle. In response to receiving the third user input, the method 200 includes dynamically changing the width of the text window, the height of the text window, or both without changing the characteristic of the text contained in the text window (e.g., the font size, the font color and the letter spacing or line spacing, or other text characteristics, do not change).

Example Graphical User Interfaces

Figure 3A:
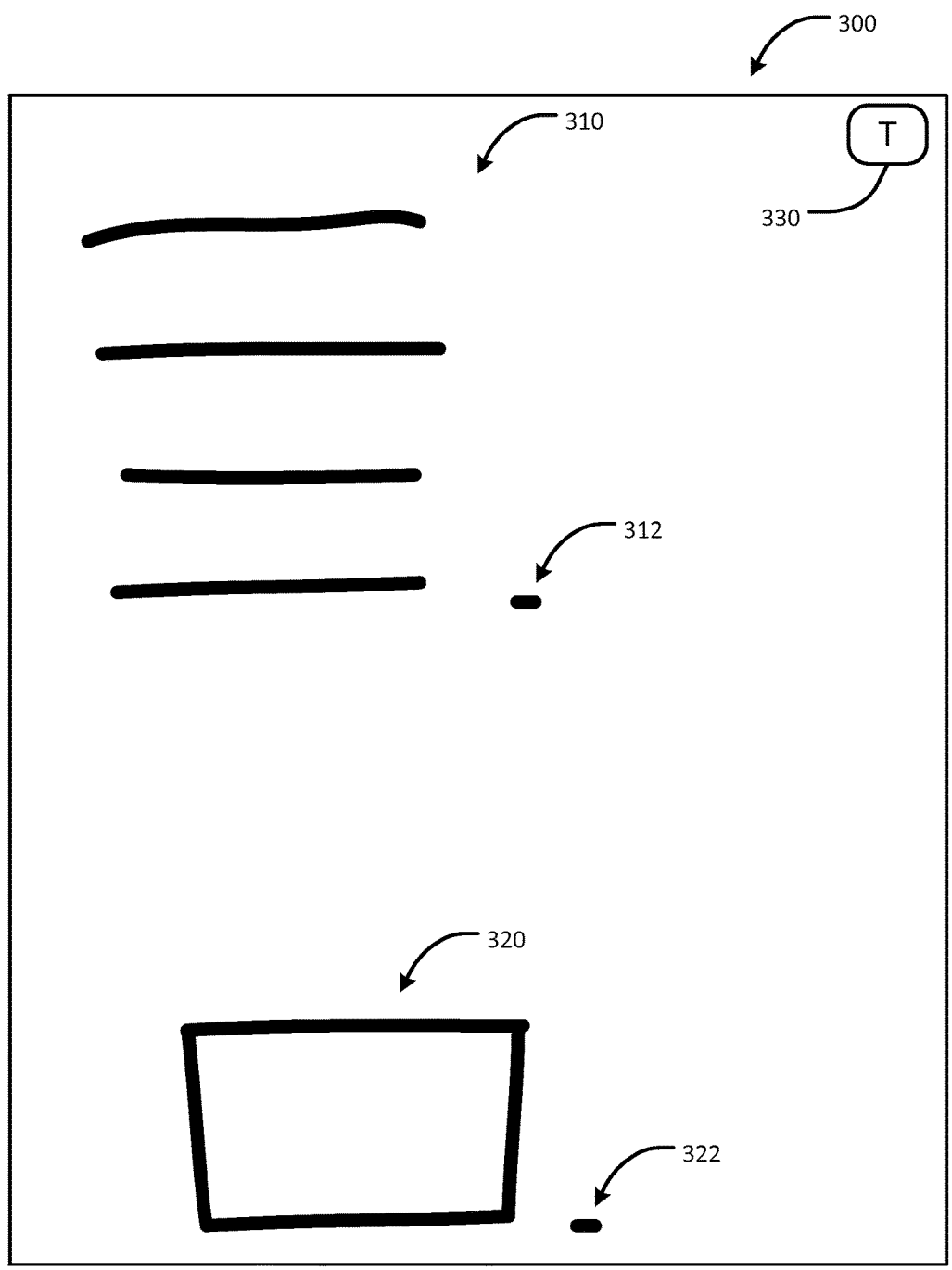

FIG. 3A shows a screenshot of an example digital design layout 300 as it appears in a GUI, in accordance with an embodiment. The layout 300 includes graphical representations of several gesture-based user inputs 310, 320 that can be generated using a touch-sensitive input device (e.g., by making a swiping gesture across the screen using a finger or stylus) or other input device (e.g., by clicking and dragging a mouse). One input, generally indicated at 310, includes several horizontal lines drawn across a portion of the layout 300. Any number of lines of any length can be drawn, and the lines can be roughly drawn (e.g., the lines do not need to be absolutely straight or horizontal). The input 310 further includes a short line or dot, generally indicated at 312. This short line or dot 312 can be used as an indication that the user has completed entering the input 310 into the layout 300, and that further processing of the input can begin. Another input, generally indicated at 320, includes a quadrilateral geometric shape drawn across another portion of the layout 300. The quadrilateral may be, for example, a square, a rectangle, or other geometric shape that generally resembles a box. The vertices or corners of the shape do not necessarily need to be connected or touching, and the shape can be roughly drawn. The input 320 further includes a short line or dot, generally indicated at 322. This short line or dot 322 can also be used as an indication that the user has completed entering the input 320 into the layout. In response to receiving the input 310 or 320 (or other suitable gesture-based inputs), an editable text field or text element can be generated and displayed in a GUI. Some examples of such editable text elements are described with respect to FIGS. 4 through 7.

Figure 3C:
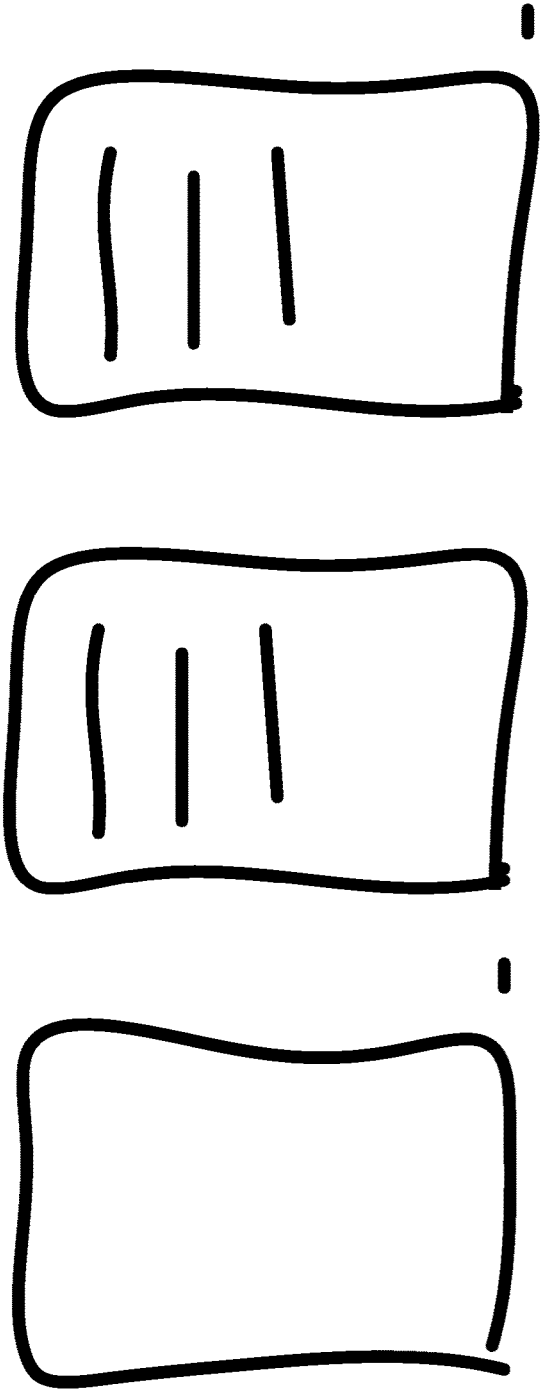

FIGS. 3B and 3C show screenshots of example alternate digital design layouts as they appear in a GUI, in accordance with various embodiments. Similar to the example digital design layout 300 of FIG. 3A, inputs such as lines, geometric shapes and dots can be used to generate a text editing element, such as described with respect to FIG. 4. In some cases, the spacing between the lines drawn and the size of the box or other geometric shape drawn are transformed into a corresponding font size and line spacing in the text editing element. For example, an input of three lines may be transformed into three lines of text, with the font size and line spacing automatically adjusted to fill the region of the GUI corresponding to the lines. In another example, an input of one line may be transformed into one line of text. In yet another example, a line and a box may be transformed into one line of text. In yet another example, an empty box or a box filled with one or more lines may be transformed into multiple lines of text. Other examples will be apparent in view of this disclosure.

Figure 4:
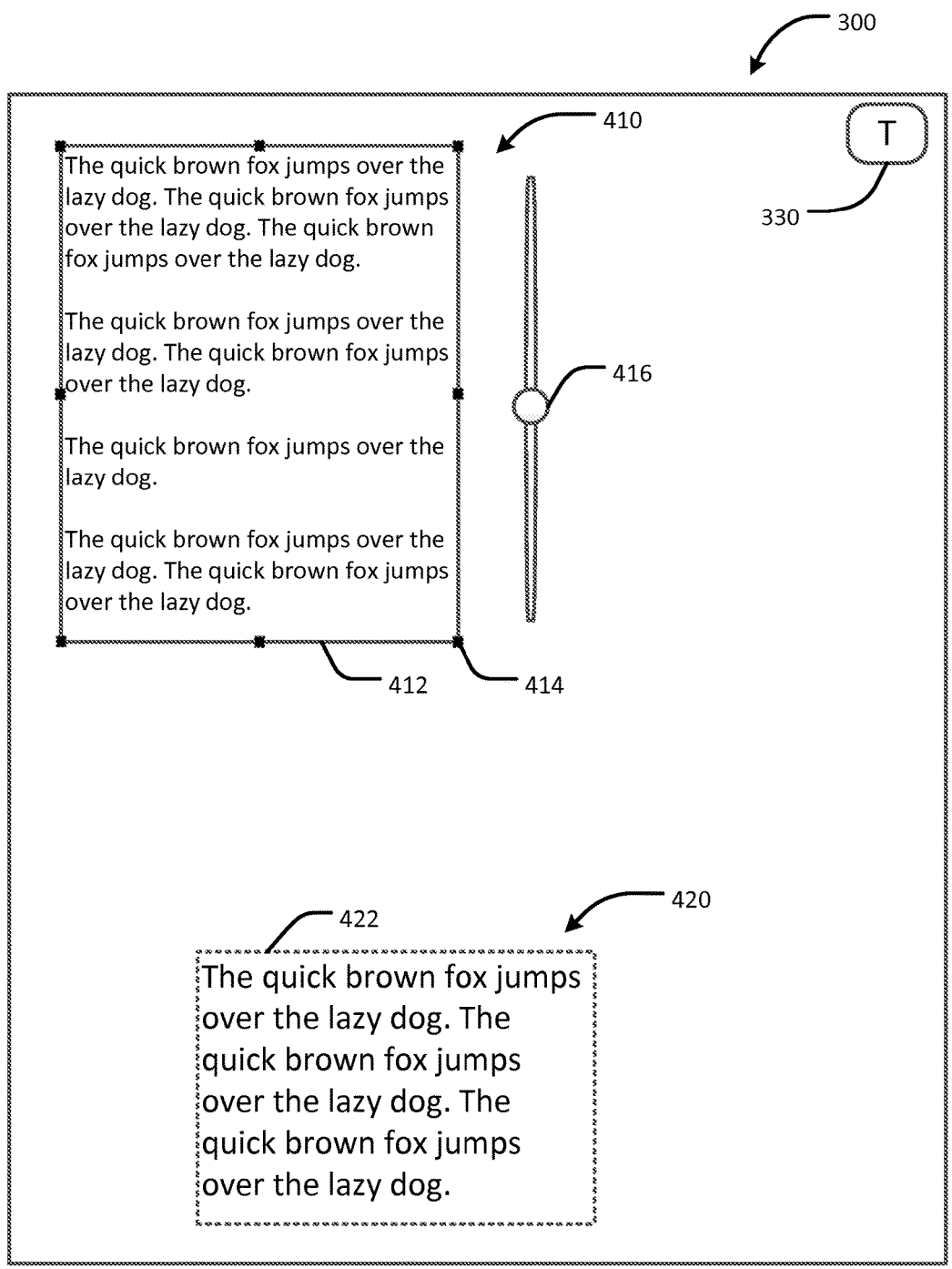
FIG. 4 shows a screenshot of the example digital design layout of FIG. 3A as it appears in a GUI, in accordance with an embodiment, of the present invention.

FIG. 4 shows a screenshot of the example digital design layout 300 of FIG. 3A as it appears in a GUI, in accordance with an embodiment. In response to the input 310, such as depicted in FIG. 3A, a graphical representation of a text editing element 410 is displayed in the layout 300 at a location near the position of the input 310. The text editing element 410 can be used as a component in various different mobile applications to allow the addition of text to the layout 300. The text editing element 410 includes a text window 412. As shown in FIG. 4, the text editing element 410 is selected for editing (e.g., by tapping on or near the text editing element 410). In some embodiments, when selected for editing, the text editing element 410 further includes resize handles 414 on the border of the text window 412, and an adjustable slide control 416 adjacent to the text window 412 (e.g., adjacent to a vertical side of the text window 412 or adjacent to a horizontal size of the text window 412). The resize handles 414, the border of the text window 412, the adjustable slide control 416, or any combination of these may be hidden from view when the text editing element 410 is not selected for editing. It will be understood that in some embodiments, the text editing element 410 does not necessarily include the adjustable slide control or the resize handles. The initial or default size of the text window 412 is approximately large enough to contain the horizontal lines of the input 310 in FIG. 3A. The initial size of the text window 412 can vary depending on how wide the horizontal lines of the input 310 are horizontally, and how far apart vertically each of the horizontal lines are spaced. As such, the user can control the initial size and location of the text window 412 by varying the width, spacing and position of the horizontal lines drawn on the layout 300. As described with respect to FIG. 5, the adjustable slide control 416 can be adjusted (e.g., up and down) using a swiping touch gesture or click-and-drag mouse input applied to the control knob or handle.

In some embodiments, other GUI tools can be used for creating a text window instead of, or in addition to, touch or swipe gestures, such as described above. For example, a text creation button 330 can be tapped or clicked to generate a text window in the layout 300. The default shape of the text window may be square or rectangular. Further the default location of the adjustable slide control 416 may be to the right of the text window 412. In some embodiments, the text editing element 410, 420 can be configured differently depending on the design application environment (e.g., to accommodate different design environments, such as photo editing or document editing). For the text inside the text window 412, the text editing element 410 can allow for customization of one or more of the following in conjunction with a document editing application: text content (e.g., by default, Lorem ipsum or quick brown fox text), text size (e.g., by default, 13 point), line and letter spacing (e.g., by default, 0.5 line spacing), text color (e.g., by default, black), or any combination of these or other text characteristics. If, for example, the text editing element 410 is used in conjunction with a photo editing application instead of with a document editing application, the default text may be changed to white, 25 point, 0 line spacing, with "Photo Header" as default text. Further, for example, if the text editing element 410 is used in a photo editing application, the shape of the text window 412 may be changed to a long rectangle, and the adjustable slide control 416 may be configured to appear below the text window 412, instead of on the right hand side.

Referring again to FIG. 4, in response to the input 320, such as depicted in FIG. 3A, a graphical representation of a text editing element 420 is displayed in the layout 300 at a location near the position of the input 320. The text editing element 420 includes a text window 422, indicated by phantom lines that are not normally visible to the user. As depicted in FIG. 4, the text editing element 410 is not selected for editing, and accordingly the resize handles, the text window border and the adjustable slide control associated with the text editing element 410 are not displayed. However, it will be understood that the text editing element 420 can be selected for editing in a manner similar to that described above with respect to text editing element 410. Further, while the text editing element 410 is selected for editing, the resize handles, text window border, or any combination of these can be displayed and active (e.g., responsive to a user input such as a tap or swipe gesture) within the layout 300 and in the same manner as the resize handles 414 and adjustable slide control 416 of the text editing element 410. The initial or default size of the text window 422 is approximately large enough to contain the quadrilateral geometric shape of the input 320 in FIG. 3A. The initial size of the text window 422 can vary depending on how far apart horizontally the vertical lines of the input 320 are spaced, and how far apart vertically each of the horizontal lines of the input 320 are spaced. As such, the user can control the initial size and location of the text window 422 by varying the size and position of the geometric shape 320 drawn on the layout 300.

Figure 5:
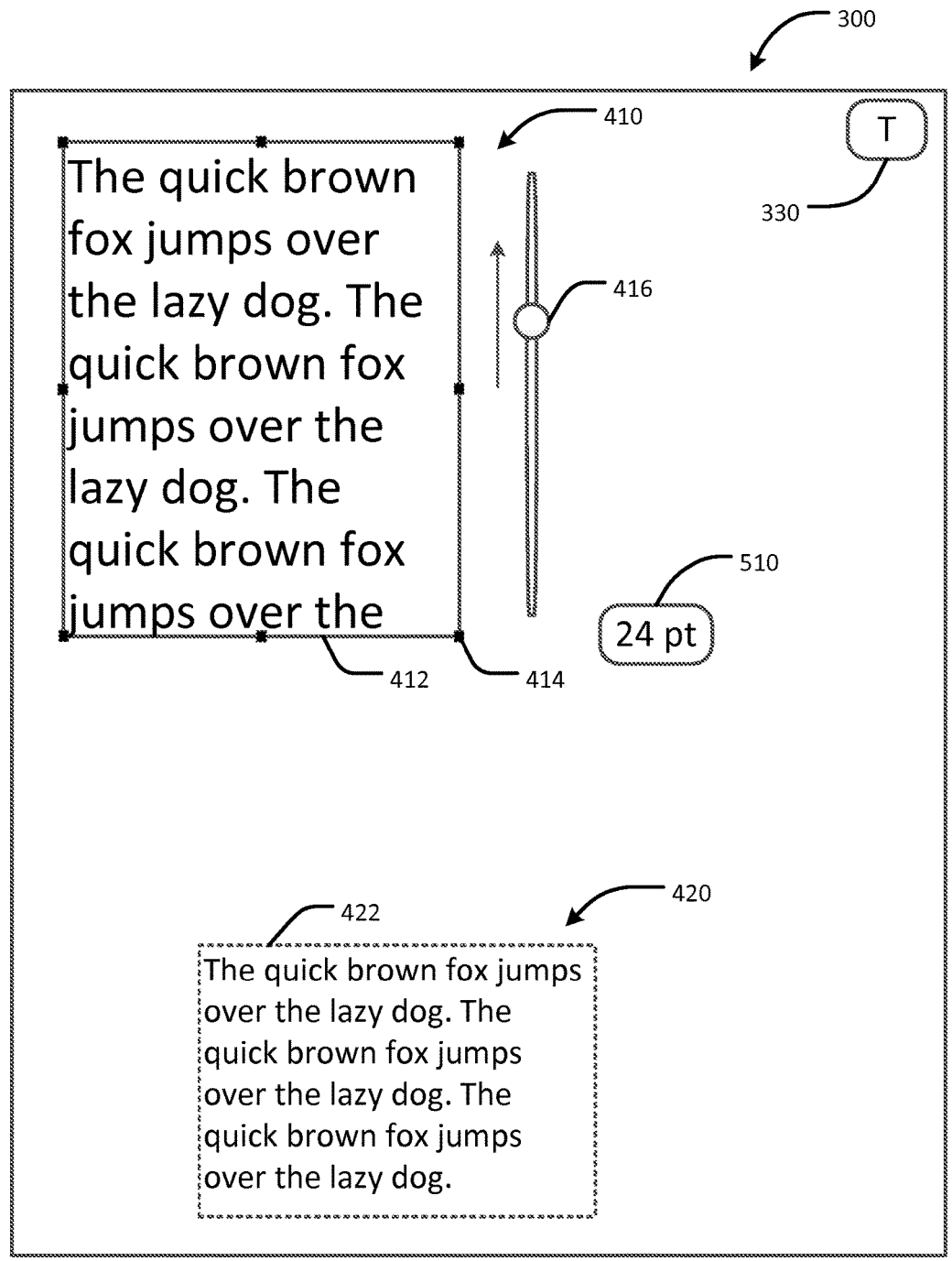
FIGS. 5 and 6 show two screenshots of the example digital design layout of FIGS. 3A and 4 as they appear in a GUI, in accordance with an embodiment of the present invention.
Figure 6:
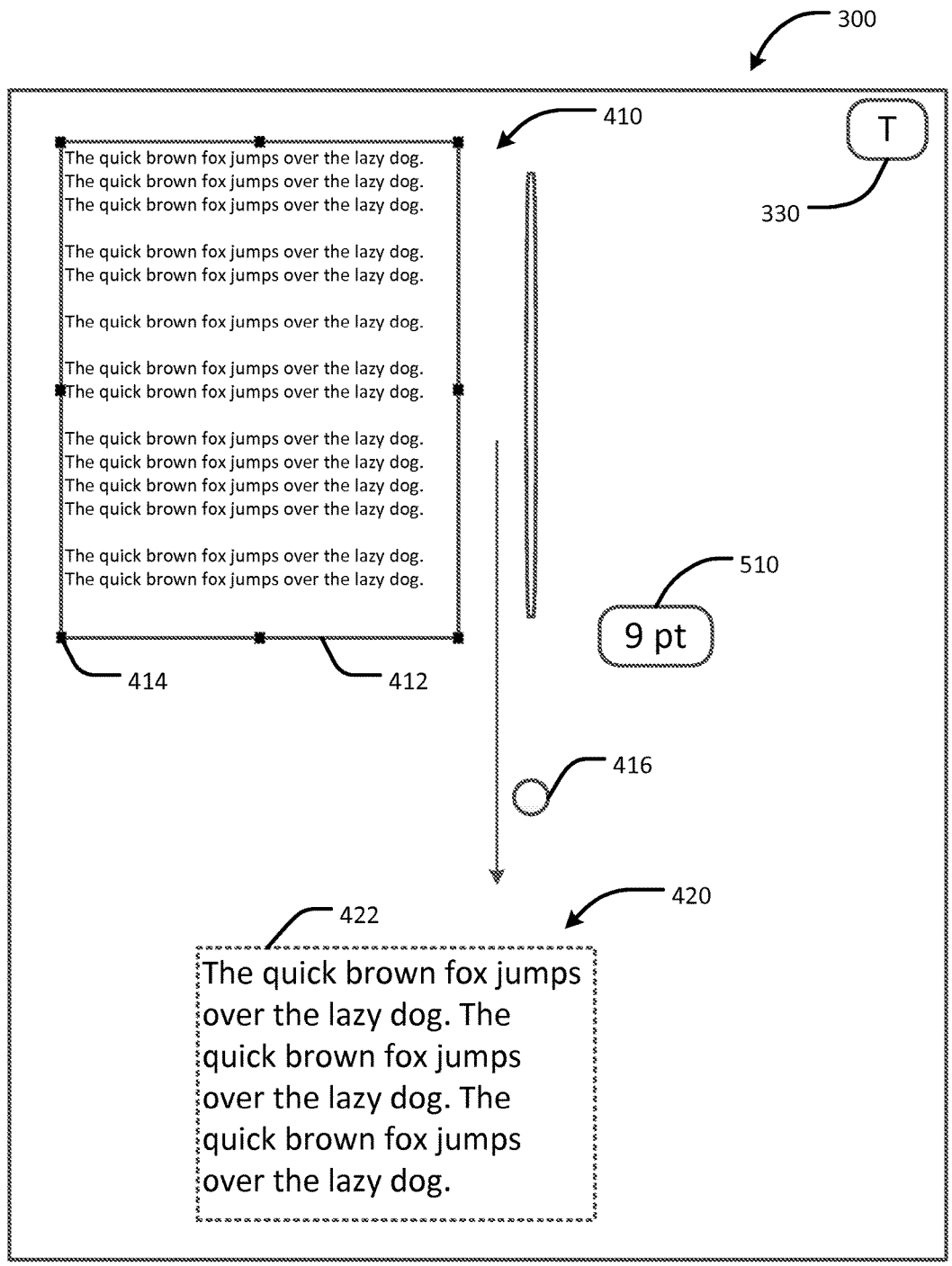

FIGS. 5 and 6 show two screenshots of the example digital design layout 300 of FIGS. 3 and 4 as they appear in a GUI, in accordance with an embodiment. In FIG. 5, the adjustable slide control 416 of the text editing element 410 is being adjusted upward using a swipe gesture or click-and-drag input. In response to receiving the upwards swipe gesture or click-and-drag input, the font size of the text in the text window 412 is increased, as can be seen, for example, in comparison to FIG. 4. The amount that the font size increases can, in some embodiments, be proportional to the distance or amount of adjustment of the adjustable slide control 416 is manipulated; that is, the further the knob on the adjustable slide control 416 is moved, the greater the increase in font size. In some embodiments, a tooltip 510 can be displayed in the layout 300 showing the currently selected font size or other value associated with the text characteristic (e.g., letter or line spacing or font color). Similarly, in FIG. 6, the adjustable slide control 416 is being adjusted downwards using a swipe gesture or click-and-drag input, which causes the font size of the text in the text window 412 to decrease. In this manner, the font size, or any other characteristic of the text (e.g., font color or letter or line spacing) can be changed (e.g., increased or decreased) with a single swiping or dragging action applied to the adjustable slide control 416 of the text editing element 410. As can also be seen in comparison to FIGS. 3 and 4, the size of the text window 412 in FIGS. 5 and 6 remains the same and does not change as the adjustable slide control 416 is manipulated. In some embodiments, the adjustable slide control can be dragged beyond the boundaries of the text window or across the entire GUI or screen, such as shown in FIG. 6.

Figure 7:
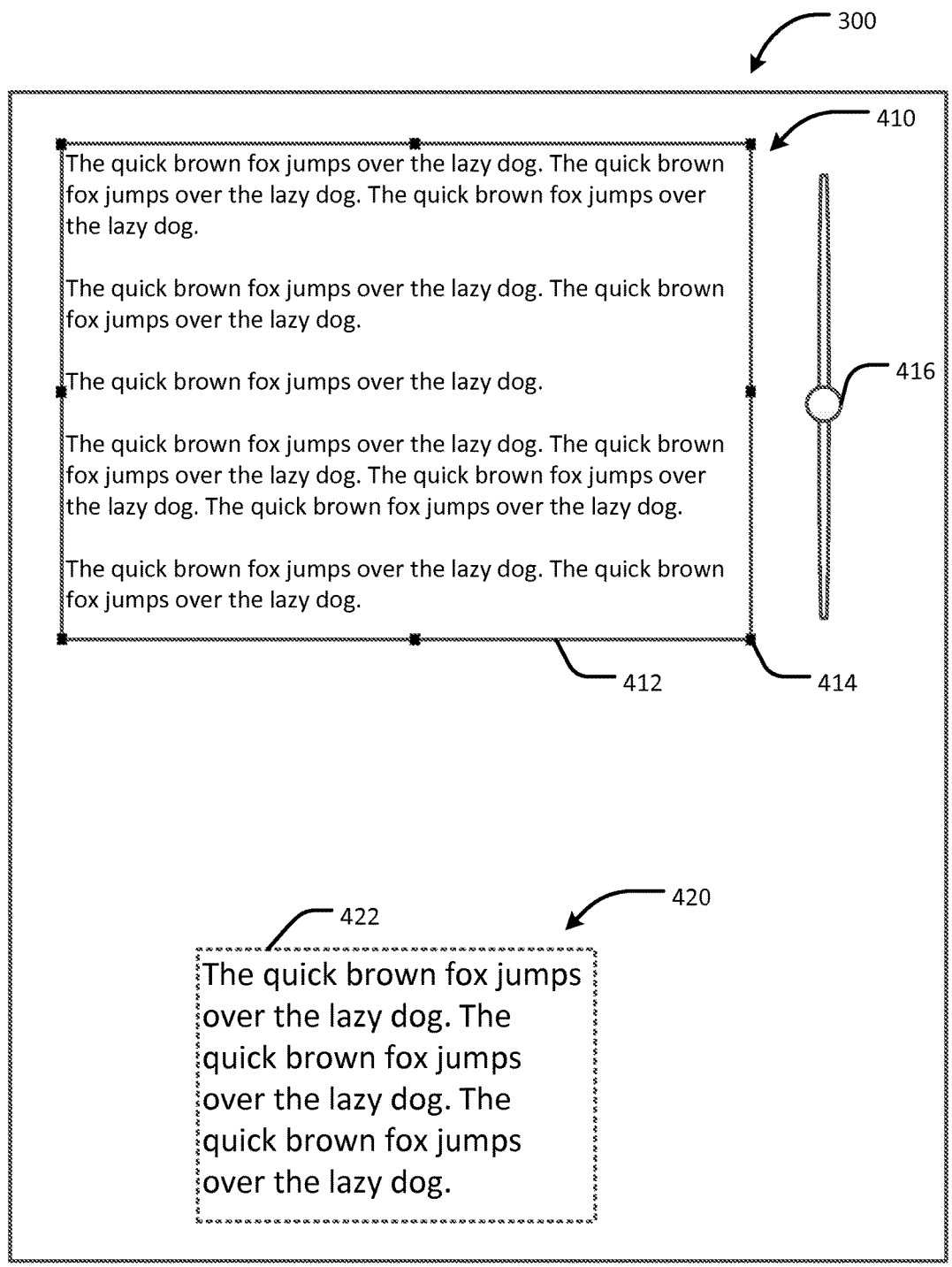
FIG. 7 shows a screenshot of the example digital design layout of FIG. 3A as it appears in a GUI, in accordance with an embodiment of the present invention.

FIG. 7 shows a screenshot of the example digital design layout 300 of FIG. 3A as it appears in a GUI, in accordance with an embodiment. In FIG. 7, one of the resize handles 414 of the text is being swiped or dragged across the layout 300. In comparison to, for example, FIG. 4, such a swiping or dragging input applied to the resize handle 414 causes the width, the height, or both of the text window 412 to change without changing the characteristics of the text (e.g., font size, font color, or letter or line spacing) contained in the text window 412. The adjustable slide control 416, the border of the text window 412, and the resize handles 414 automatically change location within the layout 300 as the size of the text window 412 changes. Although not shown, it will be understood that similar resizing actions can be performed on the other text editing element 420.

Example Computing Device

Figure 8:
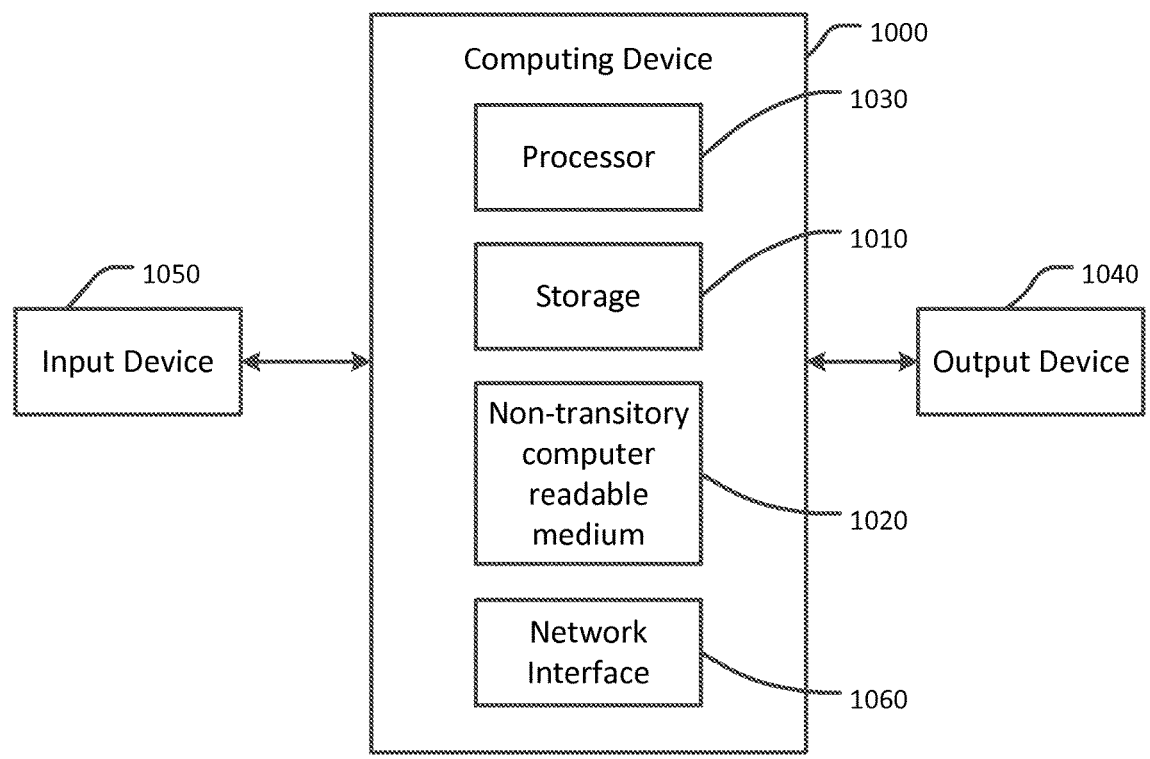
FIG. 8 is a block diagram representing an example computing device that may be used in accordance with an embodiment of the present invention.

FIG. 8 is a block diagram representing an example computing device 1000 that may be used to perform any of the techniques as variously described in this disclosure. For example, the user computing system 102, the design application 104, the GUI 106, the layout data 108, or any combination of these may be implemented in the computing device 1000. The computing device 1000 may be any computer system, such as a workstation, desktop computer, server, laptop, handheld computer, tablet computer (e.g., the iPad™ tablet computer), mobile computing or communication device (e.g., the iPhone™ mobile communication device, the Android™ mobile communication device, and the like), or other form of computing or telecommunications device that is capable of communication and that has sufficient processor power and memory capacity to perform the operations described in this disclosure. A distributed computational system may be provided comprising a plurality of such computing devices.

The computing device 1000 includes one or more storage devices 1010 and/or non-transitory computer-readable media 1020 having encoded thereon one or more computer-executable instructions or software for implementing techniques as variously described in this disclosure. The storage devices 1010 may include a computer system memory or random access memory, such as a durable disk storage (which may include any suitable optical or magnetic durable storage device, e.g., RAM, ROM, Flash, USB drive, or other semiconductor-based storage medium), a hard-drive, CD-ROM, or other computer readable media, for storing data and computer-readable instructions and/or software that implement various embodiments as taught in this disclosure. The storage device 1010 may include other types of memory as well, or combinations thereof. The storage device 1010 may be provided on the computing device 1000 or provided separately or remotely from the computing device 1000. The non-transitory computer-readable media 1020 may include, but are not limited to, one or more types of hardware memory, non-transitory tangible media (for example, one or more magnetic storage disks, one or more optical disks, one or more USB flash drives), and the like. The non-transitory computer-readable media 1020 included in the computing device 1000 may store computer-readable and computer-executable instructions or software for implementing various embodiments. The computer-readable media 1020 may be provided on the computing device 1000 or provided separately or remotely from the computing device 1000.

The computing device 1000 also includes at least one processor 1030 for executing computer-readable and computer-executable instructions or software stored in the storage device 1010 and/or non-transitory computer-readable media 1020 and other programs for controlling system hardware. Virtualization may be employed in the computing device 1000 so that infrastructure and resources in the computing device 1000 may be shared dynamically. For example, a virtual machine may be provided to handle a process running on multiple processors so that the process appears to be using only one computing resource rather than multiple computing resources. Multiple virtual machines may also be used with one processor.

A user may interact with the computing device 1000 through an output device 1040, such as a screen or monitor, which may display one or more user interfaces provided in accordance with some embodiments. The output device 1040 may also display other aspects, elements and/or information or data associated with some embodiments. The computing device 1000 may include other I/O devices 1050 for receiving input from a user, for example, a keyboard, a joystick, a game controller, a pointing device (e.g., a mouse, a user's finger interfacing directly with a display device, etc.), or any suitable user interface. The computing device 1000 may include other suitable conventional I/O peripherals, such as a camera 1052. The computing device 1000 can include and/or be operatively coupled to various suitable devices for performing one or more of the functions as variously described in this disclosure.

The computing device 1000 may run any operating system, such as any of the versions of Microsoft® Windows® operating systems, the different releases of the Unix and Linux operating systems, any version of the MacOS® for Macintosh computers, any version of the iOS® mobile operating system for mobile devices, any version of the Android mobile operating system for mobile devices, any embedded operating system, any real-time operating system, any open source operating system, any proprietary operating system, any operating systems for mobile computing devices, or any other operating system capable of running on the computing device 1000 and performing the operations described in this disclosure. In an embodiment, the operating system may be run on one or more cloud machine instances.

In other embodiments, the functional components/modules may be implemented with hardware, such as gate level logic (e.g., FPGA) or a purpose-built semiconductor (e.g., ASIC). Still other embodiments may be implemented with a microcontroller having a number of input/output ports for receiving and outputting data, and a number of embedded routines for carrying out the functionality described in this disclosure. In a more general sense, any suitable combination of hardware, software, and firmware can be used, as will be apparent.

As will be appreciated in light of this disclosure, the various modules and components of the system shown in FIG. 1, such as the design application 104, the GUI 106, the layout data 108, or any combination of these, can be implemented in software, such as a set of instructions (e.g., HTML, XML, C, C++, object-oriented C, JavaScript, Java, BASIC, etc.) encoded on any computer readable medium or computer program product (e.g., hard drive, server, disc, or other suitable non-transient memory or set of memories), that when executed by one or more processors, cause the various methodologies provided in this disclosure to be carried out. It will be appreciated that, in some embodiments, various functions performed by the user computing system, as described in this disclosure, can be performed by similar processors and/or databases in different configurations and arrangements, and that the depicted embodiments are not intended to be limiting. Various components of this example embodiment, including the computing device 1000, can be integrated into, for example, one or more desktop or laptop computers, workstations, tablets, smart phones, game consoles, set-top boxes, or other such computing devices. Other componentry and modules typical of a computing system, such as processors (e.g., central processing unit and co-processor, graphics processor, etc.), input devices (e.g., keyboard, mouse, touch pad, touch screen, etc.), and operating system, are not shown but will be readily apparent.

Numerous embodiments will be apparent in light of the present disclosure, and features described in this disclosure can be combined in any number of configurations. One example embodiment provides a system including a storage having at least one memory, and one or more processors each operatively coupled to the storage. The one or more processors are configured to carry out a process including receiving a first user input requesting creation of a text editing element in a digital layout; displaying, in response to receiving the first user input, the text editing element via a graphical user interface, the text editing element including: a graphical representation of a text window containing text, the text window having a width and a height, the text having a characteristic associated therewith; an adjustable slide control for changing the text characteristic; and a resize handle for changing at least one of the width and the height of the text window. The process further includes receiving a second user input requesting adjustment of the adjustable slide control; and changing, in response to receiving the second user input, a characteristic of the text contained in the text window without changing the width and the height of the text window. In some cases, the process includes receiving a third user input requesting repositioning of the resize handle; and changing, in response to receiving the third user input, at least one of the width and the height of the text window without changing the characteristic of the text contained in the text window. In some cases, the adjustable slide control is located adjacent to the text window, and adjustment of the adjustable slide control is not bounded by the width and the height of the text window. In some cases, the text characteristic is a font size, and the changing of the characteristic includes changing the font size from a first size to a second size that is different than the first size. In some such cases, the difference between the first and second sizes is proportional to the amount of adjustment of the adjustable slide control. In some cases, the text characteristic is a font color, and the changing of the characteristic includes changing the font color from a first color to a second color that is different than the first color. In some cases, the text characteristic is a letter spacing or a line spacing, and the changing of the characteristic includes changing the respective letter spacing or line spacing from a first spacing to a second spacing that is different than the first spacing. In some cases, the first user input includes a horizontal line drawn within a portion of the graphical user interface, and the text window is located in the same portion of the graphical user interface as the horizontal line. In some cases, the first user input includes a quadrilateral geometric shape drawn within a portion of the graphical user interface, and the text window is located in the same portion of the graphical user interface as the quadrilateral geometric shape. Another embodiment provides a non-transient computer-readable medium or computer program product having instructions encoded thereon that when executed by one or more processors cause the processor to perform one or more of the functions defined in the present disclosure, such as the methodologies variously described in this paragraph. In some cases, some or all of the functions variously described in this paragraph can be performed in any order and at any time by one or more different processors.

Another example embodiment provides a system including a storage having at least one memory, and one or more processors each operatively coupled to the storage. The one or more processors are configured to carry out a process including receiving a first user input requesting creation of a text editing element in a digital layout; displaying, in response to receiving the first user input, the text editing element via a graphical user interface, the text editing element including: a graphical representation of a text window containing text, the text window having a width and a height, the text having a characteristic associated therewith. The text characteristic includes a font size, letter spacing or line spacing that is automatically set based on the first user input. In some cases, the first user input includes a horizontal line drawn within a portion of the graphical user interface, and the text window is located in the same portion of the graphical user interface as the horizontal line. In some cases, the first user input includes a quadrilateral geometric shape drawn within a portion of the graphical user interface, and the text window is located in the same portion of the graphical user interface as the quadrilateral geometric shape. Another embodiment provides a non-transient computer-readable medium or computer program product having instructions encoded thereon that when executed by one or more processors cause the processor to perform one or more of the functions defined in the present disclosure, such as the methodologies variously described in this paragraph. In some cases, some or all of the functions variously described in this paragraph can be performed in any order and at any time by one or more different processors.

The foregoing description and drawings of various embodiments are presented by way of example only. These examples are not intended to be exhaustive or to limit the invention to the precise forms disclosed. Alterations, modifications, and variations will be apparent in light of this disclosure and are intended to be within the scope of the invention as set forth in the claims.

What is claimed is:

1. A computer-implemented method for designing a digital design layout that includes default text, the method comprising:
   receiving, via a graphical user interface, a first user input requesting creation of a text editing element in a digital layout, the first user input including at least one horizontal line provided via the graphical user interface; and
   displaying, in response to receiving the first user input, the text editing element via the graphical user interface, the text editing element including:
      a graphical representation of a text window displaying a number of lines of default text equal to or greater than a number of the horizontal lines provided via the graphical user interface, the text window having a width and a height, the default text having a characteristic associated therewith, wherein a spacing between the horizontal lines provided via the graphical user interface is transformed into a corresponding font size of the default text;

an adjustable slide control for changing the text characteristic; and a resize handle for changing at least one of the width and the height of the text window.

2. The method of claim 1, further comprising:

receiving a second user input requesting adjustment of the adjustable slide control; and changing, in response to receiving the second user input, a characteristic of the default text contained in the text window without changing the width and the height of the text window.

3. The method of claim 1, wherein the adjustable slide control is located adjacent to the text window, and wherein adjustment of the adjustable slide control is not bounded by the width and the height of the text window.

4. The method of claim 2, wherein the text characteristic is a font size, and wherein the changing of the characteristic includes changing the font size from a first size to a second size that is different than the first size.

5. The method of claim 4, wherein the difference between the first and second sizes is proportional to the amount of adjustment of the adjustable slide control.

6. The method of claim 2, wherein the text characteristic is a font color, and wherein the changing of the characteristic includes changing the font color from a first color to a second color that is different than the first color.

7. The method of claim 2, wherein the text characteristic is one of a letter spacing and a line spacing, and wherein the changing of the characteristic includes changing the respective letter spacing or line spacing from a first spacing to a second spacing that is different than the first spacing.

8. The method of claim 1, wherein the first user input includes a horizontal line drawn within a portion of the graphical user interface, and wherein the text window is located in the same portion of the graphical user interface as the horizontal line.

9. The method of claim 1, wherein the first user input includes a quadrilateral geometric shape drawn within a portion of the graphical user interface, and wherein the text window is located in the same portion of the graphical user interface as the quadrilateral geometric shape.

10. A system for designing a digital design layout that includes default text, the system comprising:

a storage; and a processor operatively coupled to the storage, the processor configured to execute instructions stored in the storage that when executed cause the processor to carry out a process comprising:

receiving, via a graphical user interface, a first user input requesting creation of a text editing element in a digital layout, the first user input including at least one horizontal line provided via the graphical user interface; and causing display, in response to receiving the first user input requesting creation of the text editing element in the digital layout, of the text editing element via the graphical user interface, the text editing element including:

a graphical representation of a text window displaying a number of lines of default text equal to or greater than a number of the horizontal lines provided via the graphical user interface, the text window having a width and a height, the default text having a characteristic associated therewith, wherein a spacing between the horizontal lines provided via the graphical interface is transformed into a corresponding font size of the default text;

an adjustable slide control for changing the text characteristic; and a resize handle for changing at least one of the width and the height of the text window.

11. The system of claim 10, wherein the process further comprises:

changing, in response to receiving a second user input requesting adjustment of the adjustable slide control, a characteristic of the default text contained in the text window without changing the width and the height of the text window.

12. The system of claim 10, wherein the adjustable slide control is located adjacent to the text window, and wherein adjustment of the adjustable slide control is not bounded by the width and the height of the text window.

13. The system of claim 11, wherein the text characteristic is a font size, and wherein the changing of the characteristic includes changing the font size from a first size to a second size that is different than the first size.

14. The system of claim 13, wherein the difference between the first and second sizes is proportional to the amount of adjustment of the adjustable slide control.

15. A non-transitory computer program product having instructions encoded thereon that when executed by one or more processors cause a process to be carried out, the process comprising:

receiving, via a graphical user interface, a first user input requesting creation of a text editing element in a digital layout, the first user input including at least one horizontal line provided via the graphical user interface; and causing display, in response to receiving the first user input requesting creation of the text editing element in the digital layout, of the text editing element via the graphical user interface, the text editing element including:

a graphical representation of a text window displaying a number of lines of default text equal to or greater than a number of the horizontal lines provided via the graphical user interface, the text window having a width and a height, the default text having a characteristic associated therewith, wherein a spacing between the horizontal lines provided via the graphical user interface is transformed into a corresponding font size of the default text;

an adjustable slide control for changing the text characteristic; and a resize handle for changing at least one of the width and the height of the text window.

16. The computer program product of claim 15, wherein the process further comprises:

changing, in response to receiving a second user input requesting adjustment of the adjustable slide control, a characteristic of the default text contained in the text window without changing the width and the height of the text window.

17. The computer program product of claim 16, wherein the text characteristic is a font color, and wherein the changing of the characteristic includes changing the font color from a first color to a second color that is different than the first color.

18. The computer program product of claim 16, wherein the text characteristic is a one of a letter spacing and a line spacing, and wherein the changing of the characteristic includes changing the respective letter spacing or line spacing from a first spacing to a second spacing that is different than the first spacing.

19. The computer program product of claim 15, wherein the first user input includes a horizontal line drawn within a portion of the graphical user interface, and wherein the text window is located in the same portion of the graphical user interface as the horizontal line.

20. The computer program product of claim 15, wherein the first user input includes a quadrilateral geometric shape drawn within a portion of the graphical user interface, and wherein the text window is located in the same portion of the graphical user interface as the quadrilateral geometric shape.

\* \* \* \* \*